United States Patent
Droux et al.

(10) Patent No.: US 8,478,853 B2
(45) Date of Patent: Jul. 2, 2013

(54) HANDLING OF MULTIPLE MAC UNICAST ADDRESSES WITH VIRTUAL MACHINES

(75) Inventors: Nicolas G. Droux, Rio Rancho, NM (US); Sunay Tripathi, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 664 days.

(21) Appl. No.: 12/474,664

(22) Filed: May 29, 2009

(65) Prior Publication Data

US 2010/0306358 A1 Dec. 2, 2010

(51) Int. Cl.
*G06F 15/173* (2006.01)

(52) U.S. Cl.
USPC ........... 709/223; 709/203; 709/245; 709/236; 709/229; 709/230; 370/389; 370/392; 370/232; 370/235; 370/229

(58) Field of Classification Search
USPC .. 709/203, 245, 236, 229, 230, 227; 370/389, 370/392, 232, 235, 229, 401
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0052972 A1 | 5/2002 | Yim | |
| 2003/0037154 A1 | 2/2003 | Poggio et al. | |
| 2005/0135243 A1 | 6/2005 | Lee et al. | |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Thuong Nguyen
(74) *Attorney, Agent, or Firm* — Osha Liang LLP (57) ABSTRACT

A method for managing a guest OS executing on a host. The method includes receiving, from the guest OS associated with a first MAC address, a second MAC address, wherein the first MAC address is associated with a first guest VNIC, wherein the second MAC address is associated with a second guest VNIC; configuring an intermediate VNIC executing on the host OS to forward packets associated with the second MAC address to the guest OS, wherein packets associated with the first MAC address and received by the intermediate VNIC are forwarded to the guest OS; and forwarding the second MAC address from the intermediate VNIC to a device driver associated with a physical NIC, wherein the device driver configures a classifier on the physical NIC to forward packets associated with the second MAC address to a first HRR located on the physical NIC associated with the intermediate VNIC.

14 Claims, 7 Drawing Sheets

U.S. PATENT DOCUMENTS

| | | | |
|---|---|---|---|
| 2005/0138620 | A1 | 6/2005 | Lewites |
| 2006/0041667 | A1 | 2/2006 | Ahn et al. |
| 2006/0070066 | A1 | 3/2006 | Grobman |
| 2006/0174324 | A1 | 8/2006 | Zur et al. |
| 2006/0209718 | A1* | 9/2006 | Kinsey et al. ............ 370/254 |
| 2006/0233168 | A1* | 10/2006 | Lewites et al. ............ 370/389 |
| 2008/0002703 | A1* | 1/2008 | Tripathi et al. ............ 370/392 |
| 2008/0005441 | A1* | 1/2008 | Droux et al. ............ 710/306 |
| 2008/0043765 | A1* | 2/2008 | Belgaied et al. ............ 370/409 |
| 2009/0327462 | A1* | 12/2009 | Adams et al. ............ 709/222 |

OTHER PUBLICATIONS

Tripathi, S.; "Crossbow: Network Virtualization and Resource Control"; Presentation to Sun Labs Open House; Jun. 1, 2006; (22 pages).

Belgaied, K. et al.; "Crossbow Hardware Resources Management and Virtualization"; Sep. 28, 2007; 14 pages.

Droux, N.; "Crossbow Network Virtualization Architecture"; Aug. 28, 2007; Solaris Core OS, Sun Microsystems, Inc.; 51 pages.

Khare, S.; "VLANs as VNICs"; Solaris Networking, Sun Microsystems, Inc.; Aug. 13, 2007; 9 pages.

Tripathi, S.; "Data Path: Soft Ring Set (SRS) and Soft Rings for Dynamic Polling & Parallelization"; Jul. 23, 2007; 7 pages.

Droux, N.; "Virtual Switching in Solaris"; Solaris Networking, Sun Microsystems, Inc.; Apr. 2, 2007; 6 pages.

Tripathi, S.; "Crossbow Architectural Document"; Nov. 21, 2006; 19 pages.

Nordmark, E., et al.; "IP Instances Interface Document"; PSARC 2006/366; Dec. 28, 2006; 18 pages.

Nordmark, E.; "IP Instances Design Document"; PSARC 2006/366; Dec. 21, 2006; 38 pages.

Droux, N.; "Crossbow: Network Virtualization and Bandwidth Partitioning"; presented at Chosug, Jun. 19, 2007; 23 pages.

Nordmark; E.; "IP Instances—Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

* cited by examiner

HANDLING OF MULTIPLE MAC UNICAST ADDRESSES WITH VIRTUAL MACHINES

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic.

Traditionally, each computer system included a single operating system and one NIC, and each NIC was associated with a single static MAC address. However, with advancements in NIC technology, some NICs may be configured with more than one MAC address.

With advances in virtualization technology, computer systems may now include multiple concurrently executing operating systems. When a system executing multiple operating systems is attached to NIC hardware with the functionality described above, the system may not be able to isolate network traffic destined to the various concurrently executing operating systems.

SUMMARY

In general, in one aspect, the invention relates to a method for managing a guest operating system (OS) executing on a host. The method includes receiving, from the guest OS associated with a first media access control (MAC) address, a second MAC address, wherein the first MAC address is associated with a first guest virtual network interface card (VNIC) residing on the guest OS, wherein the second MAC address is associated with a second guest VNIC residing on the guest OS, wherein the guest OS is executing on the host. The method further includes configuring, by a host OS executing on the host, an intermediate VNIC executing on the host OS, to forward packets associated with the second MAC address to the guest OS, wherein packets associated with the first MAC address and received by the intermediate VNIC are forwarded to the guest OS. The method further includes forwarding the second MAC address from the intermediate VNIC to a device driver associated with a physical network interface card (NIC) operatively connected to the host, wherein the device driver configures a classifier on the physical NIC to forward packets associated with the second MAC address to a first hardware receive ring (HRR) located on the physical NIC, wherein the first HRR is associated with the intermediate VNIC.

In general, in one aspect, the invention relates to a system for managing a guest operating system (OS) comprising: a physical network interface card (NIC) configured to receive a plurality of packets from a network, wherein packets associated with a first media access control (MAC) address are forwarded to a first hardware receive ring (HRR) located on the physical NIC and associated with an intermediate virtual network interface card (VNIC); a host, operatively connected to the physical NIC, comprising: a processor; a device driver associated with the physical NIC; the guest OS comprising: a first guest VNIC associated with the first MAC address; a second guest VNIC associated with a second MAC address; and a host OS, executing on the processor, comprising the first intermediate VNIC configured to forward packets associated with the first MAC address to the guest OS, wherein the host OS is configured to: receive, from the guest OS, the second MAC address; forward the second MAC address to the intermediate VNIC; and forward the second MAC address from the intermediate VNIC to the device driver, wherein the device driver is configured to receive the second MAC address from the intermediate VNIC and configure the physical NIC to forward packets associated with the second MAC address to the first HRR.

In general, in one aspect, the invention relates to a computer readable medium comprising software instructions for managing a guest operating system (OS), wherein the software instructions comprise functionality to: receive, from the guest OS associated with a first media access control (MAC) address, a second MAC address, wherein the first MAC address is associated with a first guest virtual network interface card (VNIC) residing on the guest OS, wherein the second MAC address is associated with a second guest VNIC residing on the guest OS, wherein the guest OS is executing on the host; configure, by a host OS executing on the host, an intermediate VNIC executing on the host OS, to forward packets associated with the second MAC address to the guest OS, wherein packets associated with the first MAC address and received by the intermediate VNIC are forwarded to the guest OS; and forward the second MAC address from the intermediate VNIC to a device driver associated with a physical network interface card (NIC) operatively connected to the host, wherein the device driver configures a classifier on the physical NIC to forward packets associated with the second MAC address to a first hardware receive ring (HRR) located on the physical NIC, wherein the first HRR is associated with the intermediate VNIC.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for managing guest operating systems on a host. Specifically, embodiments of the invention may enable a host operating system (OS) to receive a media access control (MAC) address from a guest OS, and configure elements on the host (and associated NIC(s)) to direct packets associated with that MAC address to the guest OS.

Figure 1:
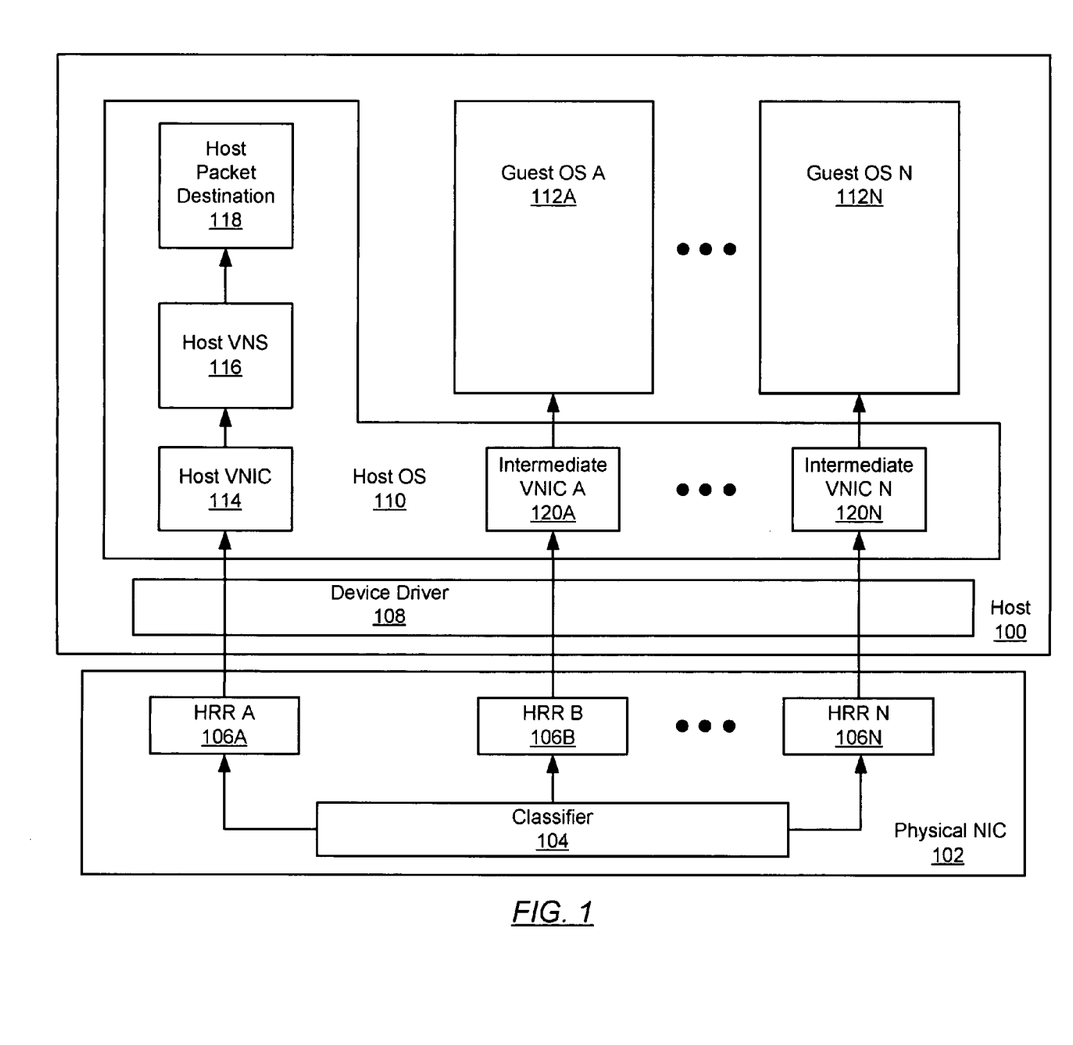
FIG. 1 shows a system in accordance with one or more embodiments of the invention.

FIG. 1 shows a system in accordance with one embodiment of the invention. As shown in FIG. 1, the system includes a host (100) (also referred to as a physical host) operatively connected to a network interface card (NIC) (102). The NIC (102) provides an interface between the host (100) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the NIC (102) for processing, etc. In one embodiment of the invention, the NIC (102) includes a classifier (104) and one or more hardware receive rings (HRRs) (106A, 106B, 106N). In one embodiment of the invention, the HRRs (106A, 106B, 106N) correspond to portions of memory within the NIC (102) used to temporarily store the received packets. In one embodiment of the invention, the classifier (104) is configured to analyze the incoming network traffic, typically in the form of packets, received from the network (not shown).

In one embodiment of the invention, the NIC may be configured to receive network traffic addressed using one or more MAC addresses. As is known in the art, a MAC address is a link layer identifier associated with a NIC. A MAC address may differentiate a NIC from all other NICs globally, or a MAC address may differentiate the NIC only from other NICs on the same local network. A NIC may be associated with only one MAC address, or may be associated with more than one MAC address. Further, a NIC may be configured to add or remove associated MAC addresses as necessary.

In one embodiment of the invention, analyzing the packets by the classifier (104) includes analyzing one or more fields in each of the packets to determine to which of the HRRs (106A, 106B, 106N) the packets are forwarded. As an alternative, the classifier (104) may use the contents of one or more fields in each packet as an index into a data structure that includes information necessary to determine to which HRR (106A, 106B, 106N) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102). Further, in one embodiment of the invention, the NIC (102) may include a direct memory access (DMA) engine (not shown), which includes functionality to transfer packets from the NIC to the host (100).

In one embodiment of the invention, the host (100) includes a device driver (108), a host operating system (OS) (110) and one or more guest OSs (112A, 112N). In one embodiment of the invention, the device driver (108) provides an interface between one or more HRRs (e.g., 106A) and the host OS (110). More specifically, the device driver (108) exposes one or more HRRs (106A, 106B, 106N) to the host OS (110).

In one embodiment of the invention, the host OS (110) is configured to provide functionality to create virtual execution environments (e.g., virtual machines) (not shown) in which the guest OSs may execute. Further, the host OS (110) may include functionality to manage the aforementioned virtual environments. The virtual environments may be provided using well known techniques in the art. An example of virtual execution environment is a Solaris™ Container. In such cases, the Solaris™ Container may execute in the host OS, which may be a Solaris™ OS. Solaris™ is a trademark of Sun Microsystems, Inc. Those skilled in the art will appreciate that other virtualization technologies such as VMware® Server (VMware® a registered trademark of VMware, Inc.) and Xen® (Xen® is a trademark overseen by the Xen Project Advisory Board) may also be used to provide virtual execution environments.

In one embodiment of the invention, each virtual execution environment includes functionality to execute an operating system (i.e., a guest OS). Further, each virtual execution environment may be isolated such that processes within a virtual execution environment may not communicate with other processes in other virtual execution environments. In addition, each virtual execution environment may be associated with a portion of the total hardware and processing resources of the host. In one embodiment of the invention, the host OS (110) may include the functionality to send messages to, and receive messages from, elements within each of the virtual execution environments, including the guest OSs (112A, 112N).

Continuing with the discussion of FIG. 1, in one embodiment of the invention, the host OS (110) may include the following components: a host virtual NIC (VNIC) (114), a host virtual network stack (VNS) (116), a host packet destination (118), and one or more intermediate VNICs (e.g., 120A, 120N). In one embodiment of the invention, the host VNIC (114) and the intermediate VNICs (120A, 120N) are located within the host OS (110). In one embodiment of the invention, the VNICs (114, 120A, 120N) are located in the MAC layer (not shown) of the host OS (110). Each VNIC (114, 120A, 120N) may be associated with one or more HRRs (106A, 106B, 106N). Each VNIC (114, 120A, 120N) provides an abstraction layer between the NIC (102) and the host packet destinations (118) (containers and/or services) and guest OSs (112A, 112N) executing on the host OS (110). More specifically, each VNIC (e.g., 114, 120A, 120N) operates like a NIC (102).

For example, in one embodiment of the invention, each VNIC (114, 120A, 120N) is associated with one or more Internet Protocol (IP) addresses, one or more ports, and configured to handle one or more protocol types. Thus, while the host OS (110) may be operatively connected to a single NIC (102), packet destinations (e.g., containers and/or services) and guest OSs (114A, 114N) executing on the host OS (108) operate as if the host OS (108) is bound to multiple NICs. Said another way, each VNIC (114, 120A, 120N) operates like a separate network device connected to the network.

In one embodiment of the invention, the host VNIC (114) may be operatively connected to a corresponding host VNS (116). In one embodiment of the invention, the host VNS (116) includes functionality to process packets in accordance with various protocols used to send and receive packets (e.g., Transmission Communication Protocol (TCP), Internet Protocol (IP), User Datagram Protocol (UDP), etc.). The host VNS (116) may also include functionality to send and receive packets from an associated host VNIC (114). Further, the host VNS (116) may also include functionality to send and receive packets from one or more associated packet destinations (118).

In one embodiment of the invention, each host VNS (116) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each guest OS (112A, 112N) may interact with its associated intermediate VNIC (120A, 120N) as though it were a physical NIC. In one embodiment of the invention, each intermediate VNIC (120A, 120N) may receive network traffic addressed to one or more guest OSs (112A, 112N). Further, each intermediate VNIC (112A, 112N) may include the functionality to receive and process packets associated with one or more MAC addresses. In one embodiment of the invention, the intermediate VNICs (112A, 112N) are configured by the host OS (110) to accept or reject packets associated with a specific MAC address(es). The intermediate VNICs (112A, 112N) may forward messages from the host OS (110) via the device driver (108) to the NIC (102). In one embodiment of the invention, a message sent from an intermediate VNIC (112A, 112N) may instruct the classifier (104) to forward packets associated with a specific MAC address(es) to the HRR associated with the intermediate VNIC (112A, 112N).

Figure 2:
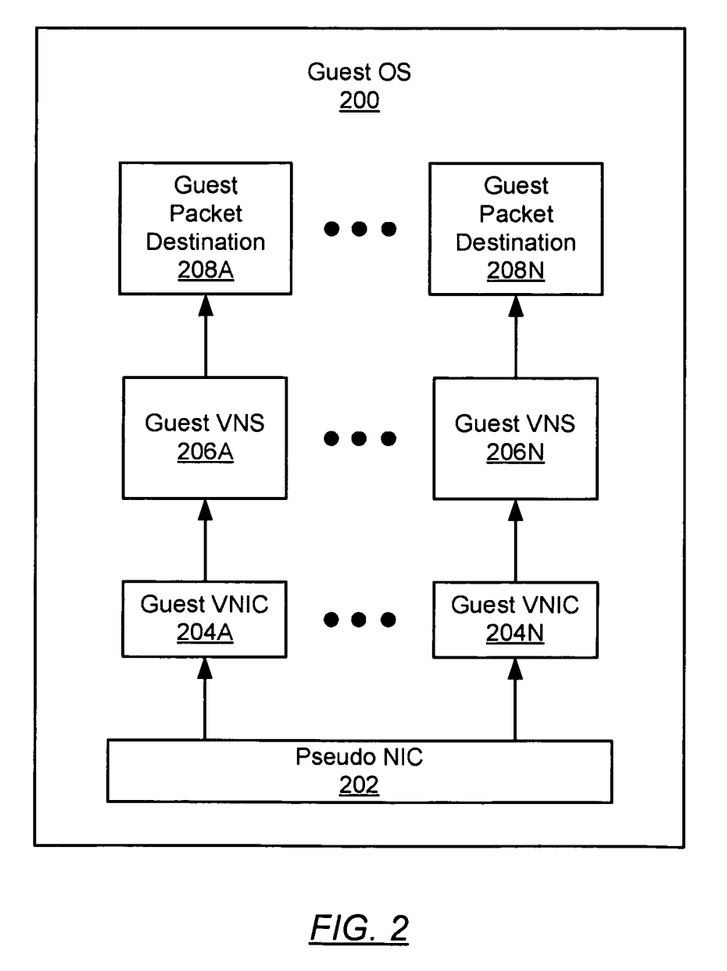
FIG. 2 shows a guest operating system in accordance with one or more embodiments of the invention.

FIG. 2 shows a guest OS in accordance with one embodiment of the invention. As shown in FIG. 2, the guest OS (200) may include a pseudo NIC (202), one or more guest VNICs (204A, 204N), one or more guest VNSs (206A, 206N), and one or more guest packet destinations (208A, 208N). Each of these components is described below. Those skilled in the art will appreciate that the guest OS may include further elements not shown in FIG. 2.

In one embodiment of the invention, the pseudo NIC (202) provides an interface between one or more intermediate VNICs (e.g., 120A, 120N in FIG. 1) and the guest OS (200). The pseudo NIC (202) may include functionality similar to that of a physical NIC or VNIC described above. In one embodiment of the invention, the pseudo NIC (202) may be configured to accept traffic associated with one or more MAC addresses. In one embodiment of the invention, the pseudo NIC (202) may be configured by the guest OS (200) and/or by the host OS (110 in FIG. 1).

In one embodiment of the invention, the pseudo NIC (202) includes functionality to communicate with the host OS (110 in FIG. 1). Specifically, the pseudo NIC (202) may include the functionality to alert the host OS (110 in FIG. 1) that the guest OS (202) has created a new guest VNIC (204A, 204N). In one embodiment of the invention, the pseudo NIC (202) includes the functionality to send a message to the host OS (110 in FIG. 1) that includes the MAC address of the newly created guest VNIC (204A, 204N).

In one embodiment of the invention, the guest VNICs (204A, 204N) provide an abstraction layer between the pseudo NIC (202) and the guest packet destinations (208A, 208N), and operate in the same manner as the host VNIC (114 in FIG. 1) described above. Each guest VNIC (204A, 204N) may be operatively connected to a guest VNS (206A, 206N). Each guest VNS (206A, 206N) may include functionality to send and receive packets from an associated guest VNIC (204A, 204N), and may include some or all of the functionality of the host VNS (116 in FIG. 1) described above. In one embodiment of the invention, each guest VNS (206A, 206N) executing on the guest OS (200) may be associated with one or more guest packet destinations (208A, 208N) (e.g., containers and/or services) executing within the guest OS (200).

Figure 3:
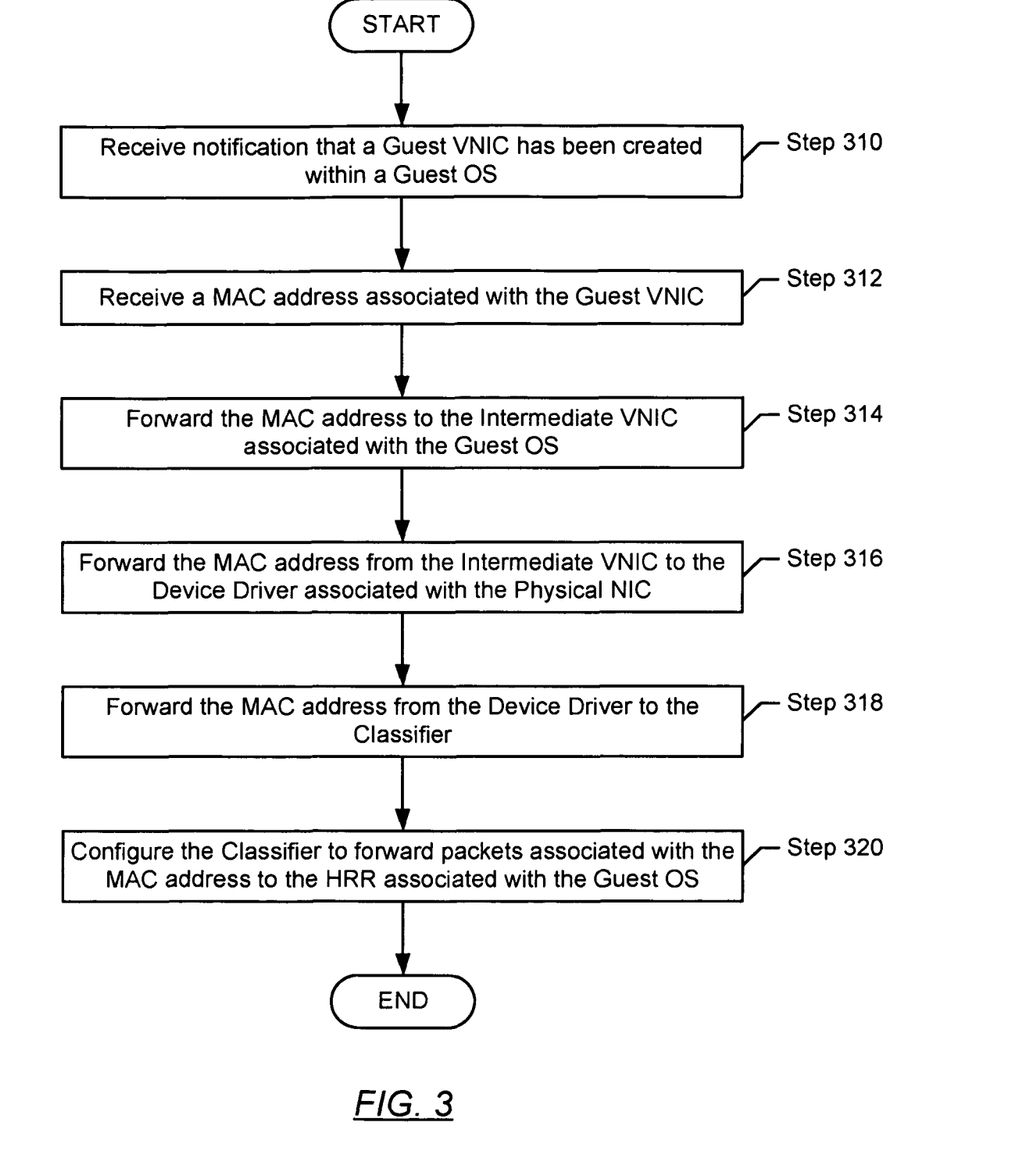
FIG. 3 shows a flowchart in accordance with one or more embodiments of the invention.

FIG. 3 shows a flow chart for receiving a MAC address from a guest OS in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 310, the host OS receives notification that a guest VNIC has been created within a guest OS. In Step 312, the host OS receives a MAC address associated with the guest VNIC. In Step 314, the MAC address is forwarded to the intermediate VNIC associated with the guest OS. In Step 316, the MAC address is forwarded from the intermediate VNIC to the device driver associated with the physical NIC. In Step 318, the MAC address is forwarded from the device driver to the classifier. In Step 320, the classifier is configured to forward packets associated with the MAC address to the HRR associated with the guest OS. In one embodiment of the invention, the classifier is configured by the device driver associated with the physical NIC. Those skilled in the art will appreciate that other mechanisms known in the art may be used to configure the classifier.

Figure 4:
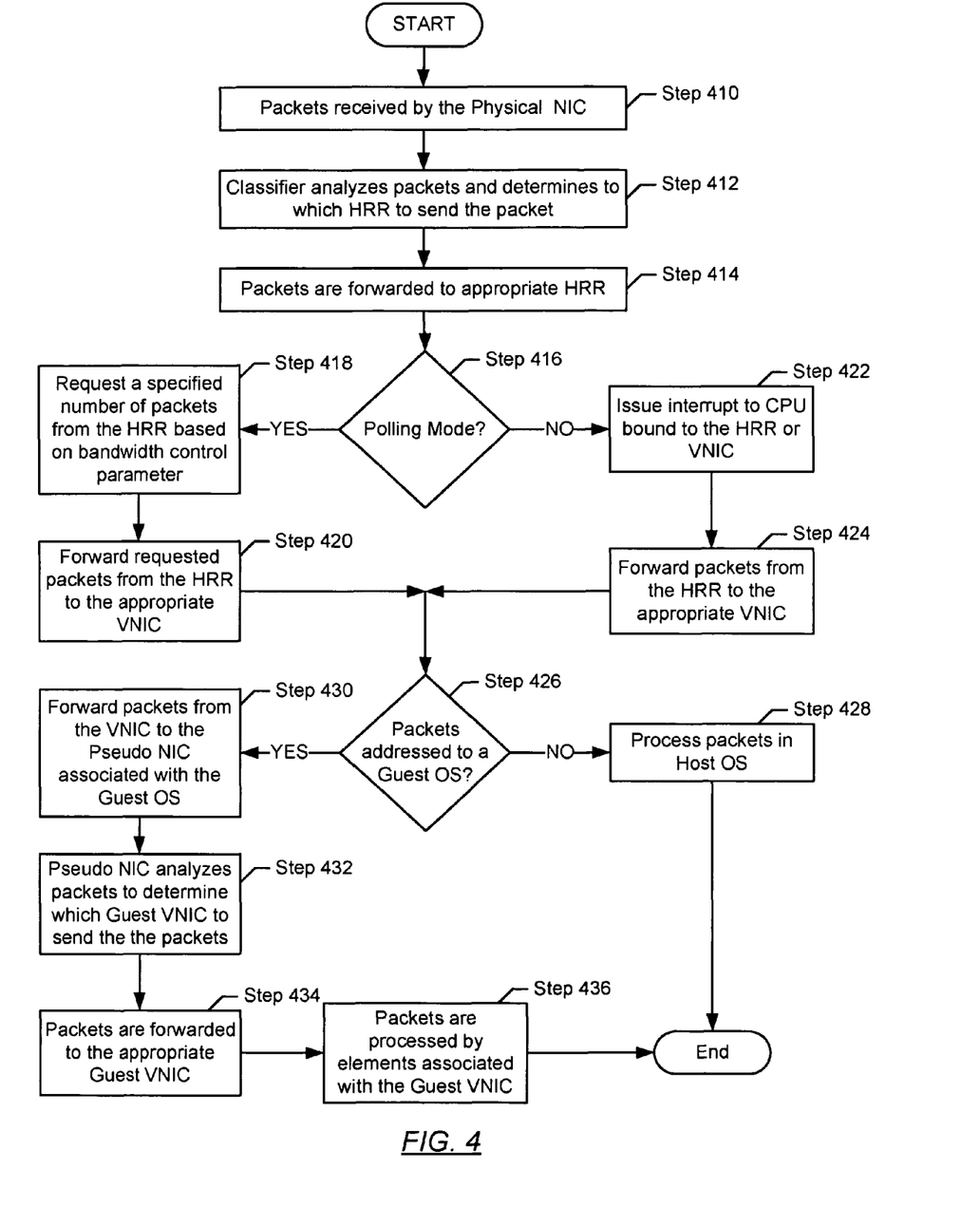
FIG. 4 shows a flowchart in accordance with one or more embodiments of the invention.

FIG. 4 shows a flow chart for receiving packets by a classifier configured accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 410, packets are received from the network by the physical NIC. In Step 412, the classifier analyzes the packets and determines the HRR that the packets are to be forwarded. In Step 414, the packets are forwarded to the appropriate HRR. In Step 416, a determination is made as to whether the VNIC (either a host VNIC or intermediate VNIC) associated with the HRR is operating in polling mode or interrupt mode.

If the VNIC is operating in polling mode, then in Step 418, a specified number of packets are requested from the HRR based on a bandwidth control parameter (i.e., a parameter specifying the number of packets (or number of bytes of data) to be sent to the VNIC within a given period of time). In Step 420, the requested packets are forwarded from the HRR to the appropriate VNIC. If the VNIC is operating in interrupt mode, then in Step 422, the HRR issues an interrupt to the CPU (or the appropriate processing component). In Step 424, packets are forwarded from the HRR to the appropriate VNIC.

In Step 426, a determination is made as to whether the packets are addressed to a guest OS. If the packets are not addressed to a guest OS, then in Step 428, the packets are processed in the host OS. In one embodiment of the invention, packets received by the host VNIC are forwarded to the host VNS, and packets processed by the host VNS are then forwarded to the appropriate host packet destination.

If the packets are addressed to a guest OS, then in Step 430, the packets are forwarded from the VNIC to the pseudo NIC associated with the guest OS. In one embodiment of the invention, the VNIC receiving the packets from the HRR is an intermediate VNIC executing within the host OS. The intermediate VNIC may be associated with a guest OS, and may be configured to receive packets addressed to a MAC address associated with the guest OS. In one embodiment of the invention, a guest OS may be associated with more than one MAC address, and the VNIC associated with the guest OS may be configured to receive packets addressed to any MAC address associated with the guest OS. In Step 432, the pseudo NIC analyzes the MAC address of each packet to determine which guest VNIC is to receive the packet. In one embodiment of the invention, incoming packets are classified by other elements within the MAC layer of the guest OS. In Step 434, the packets are forwarded to the guest VNIC associated with the MAC address of the packets. In Step 436, the packets are processed by elements associated with the appropriate guest VNIC.

Figure 5A:
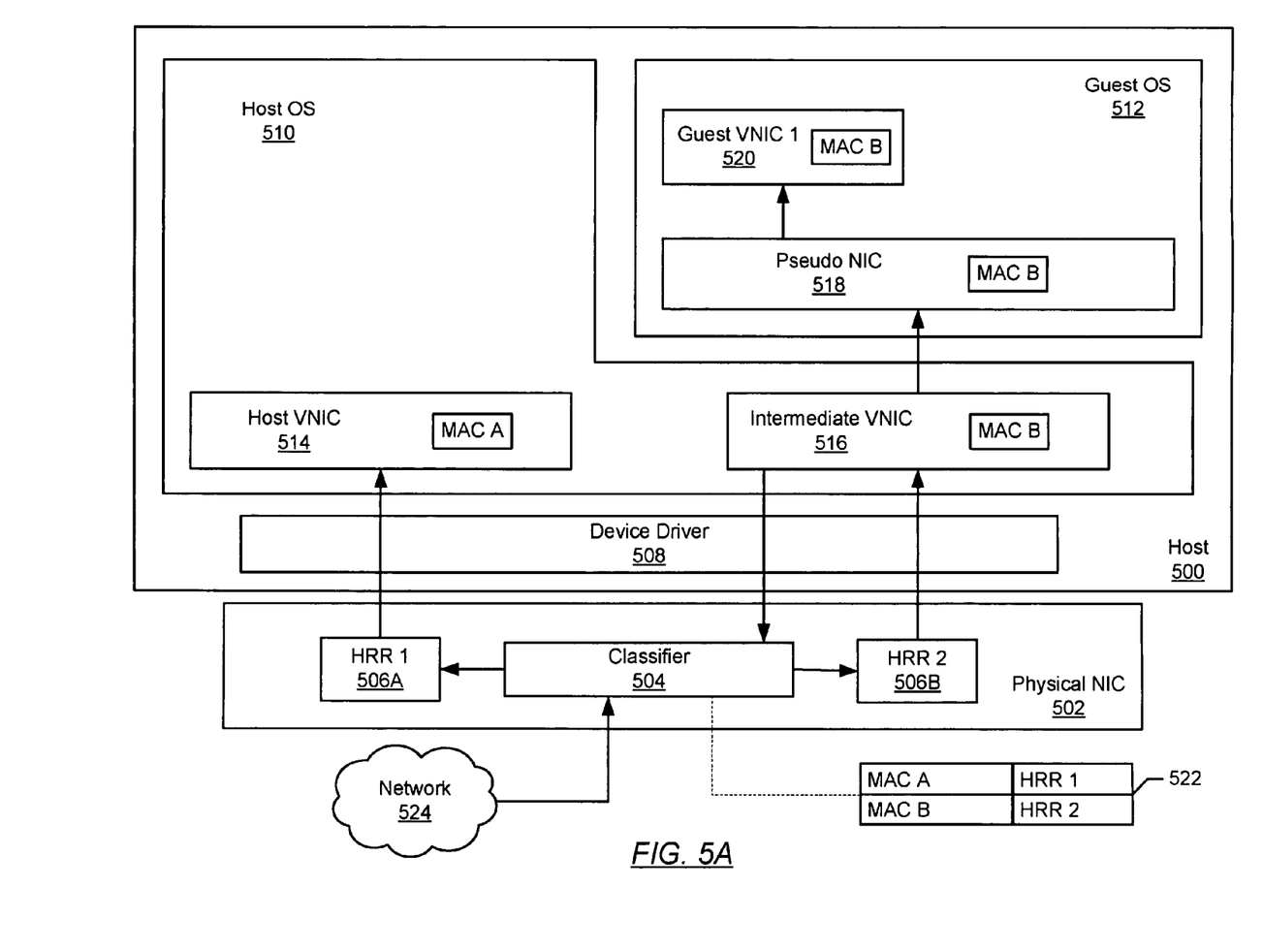
FIG. 5A shows an example in accordance with one or more embodiments of the invention.
Figure 5B:
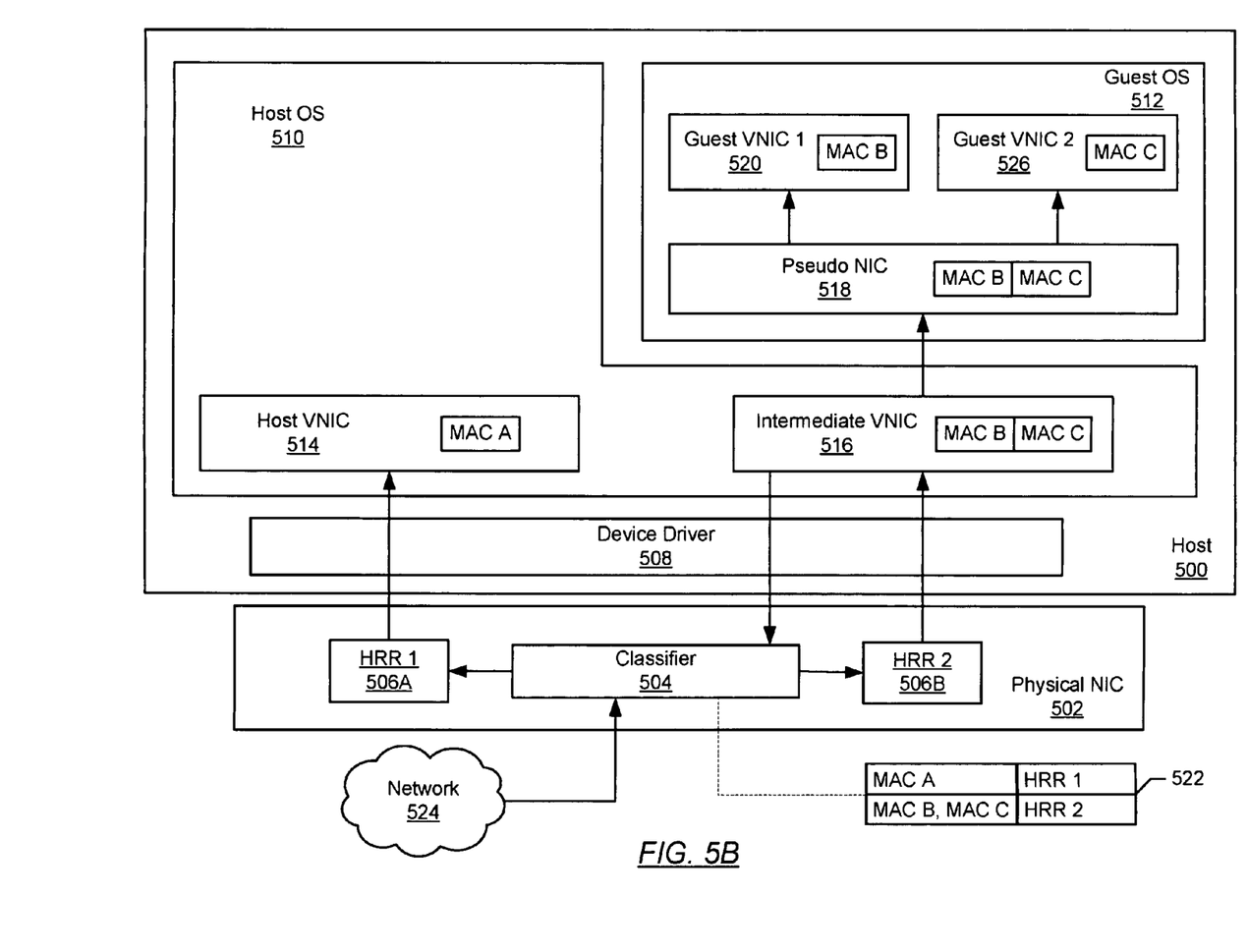
FIG. 5B shows an example in accordance with one or more embodiments of the invention.

FIGS. 5A and 5B show one exemplary system in accordance with one embodiment of the invention. The exemplary system is not intended to limit the scope of the invention. Further, some elements unnecessary for the purposes of the exemplary figure may have been omitted.

The example system in FIG. 5A includes a host (500) operatively connected to a physical NIC (502). The physical NIC (502) includes a classifier (504), and two HRRs (506A, 506B). The host (500) includes a device driver (508), a host OS (510), and a guest OS (512). The host OS (510) includes a host VNIC (514), and an intermediate VNIC (516). The host VNIC (514) and the intermediate VNIC (516) are each initially associated with a MAC address (i.e., MAC A and MAC B, respectively).

As depicted in the exemplary system of FIG. 5A, the guest OS (512) includes a pseudo NIC (518) and a guest VNIC (guest VNIC 1 (520)). The pseudo NIC (518) and guest VNIC 1 (520) are initially both associated with the address MAC B.

The classifier (502) maintains a table (522) that indicates which HRR is associated with each MAC address. As depicted in the exemplary system of FIG. 5A, the table (522) indicates that packets associated with MAC A are forwarded to HRR 1 (506A), and packets associated with MAC B are forwarded to HRR 2 (506B). Packets received from the network (524) are analyzed by the classifier (504) to determine the destination MAC address associated with each packet. Using the destination MAC address in each packet, the classifier (504) queries the table (522) to determine the appropriate HRR (506A, 506B) to which the packet is to be forwarded.

Assume, for the purposes of this example, that the classifier (504) depicted in the exemplary system of FIG. 5A receives packets associated with MAC B. In this scenario, the classifier queries the table (522) for a HRR associated with MAC B and determines that packets associated with MAC B are forwarded to HRR 2 (506B). Accordingly, the classifier forwards the packets to HRR 2 (506B). Packets received by HRR 2 (506B) are forwarded to the intermediate VNIC (516) (i.e., the VNIC mapped to HRR 2). The intermediate VNIC (516), configured to receive packets associated with MAC B, forwards the packets to the guest OS (512). Within the guest OS (512), packets are received by the pseudo NIC (518). The pseudo NIC (518) makes a determination as to which guest VNIC is to receive the packets, and forwards the packets to the guest VNIC associated with MAC B (i.e., guest VNIC 1 (520) in this example).

Assume however, that the classifier (504) depicted in the exemplary system of FIG. 5A receives packets associated with MAC C. Similar to the processing of packets discussed above, the classifier queries the table (522) for a HRR associated with MAC C. Because there is no entry in the table (522) for MAC C, packets associated with MAC C are ignored by the classifier (504) and subsequently dropped by the NIC (502).

Now referring to FIG. 5B, assume that guest VNIC 2 (526) is created in the guest OS (512). Guest VNIC 2 (526) is associated with MAC C. The pseudo NIC (518) is now associated with MAC addresses MAC B and MAC C, and is configured to forward packets associated with MAC B to guest VNIC 1 (520), and to forward packets associated with MAC C to guest VNIC 2 (526). In addition, the pseudo NIC (518) forwards the MAC address of the newly created guest VNIC 2 (526) (i.e., MAC C) to the host OS (510).

Upon receipt of the aforementioned information, the host OS configures the intermediate VNIC (516) to accept packets associated with MAC C (in addition to MAC B). At this point, the intermediate VNIC (516) is configured to forward packets associated with MAC B and packets associated with MAC C to the guest OS (512). Additionally, the intermediate VNIC (516) forwards the information associated with MAC C to the classifier (504) via the device driver (508). Once the classifier (504) receives the information associated with MAC C, the table (522) is updated to associate MAC C with HRR 2 (506B).

Assume now, for the purposes of this example, that the classifier (504) depicted in the exemplary system of FIG. 5B receives packets associated with MAC C. In this scenario, the classifier queries the table (522) for a HRR associated with MAC C and determines that packets associated with MAC C are forwarded to HRR 2 (506B). Accordingly, the classifier forwards the packets to HRR 2 (506B). Packets received by HRR 2 (506B) are forwarded to the intermediate VNIC (516). The intermediate VNIC (516), configured to receive packets associated with MAC B and MAC C, forwards the packets to the guest OS (512). Within the guest OS (512), packets are received by the pseudo NIC (518). The pseudo NIC (518) determines that the received packets are associated with MAC C, and forwards the packets to the guest VNIC associated with MAC C (e.g., guest VNIC 2 (526)).

One or more embodiments of the invention provide a method for limiting the packets transferred to the guest OS to only those packets that have a destination MAC address associated with a VNIC in the guest OS. Further, packets that do not have a destination MAC address corresponding to a MAC address associated with a guest VNIC (e.g., MAC B associated with Guest VNIC 1 in FIG. 5B) are not sent to the intermediate VNIC.

Moreover, one or more embodiments of the invention allow packets with a source MAC address corresponding to a MAC address associated with a guest VNIC (e.g., MAC B associated with Guest VNIC 1 in FIG. 5B) to be sent from the Guest OS via the intermediate VNIC to the NIC.

Figure 6:
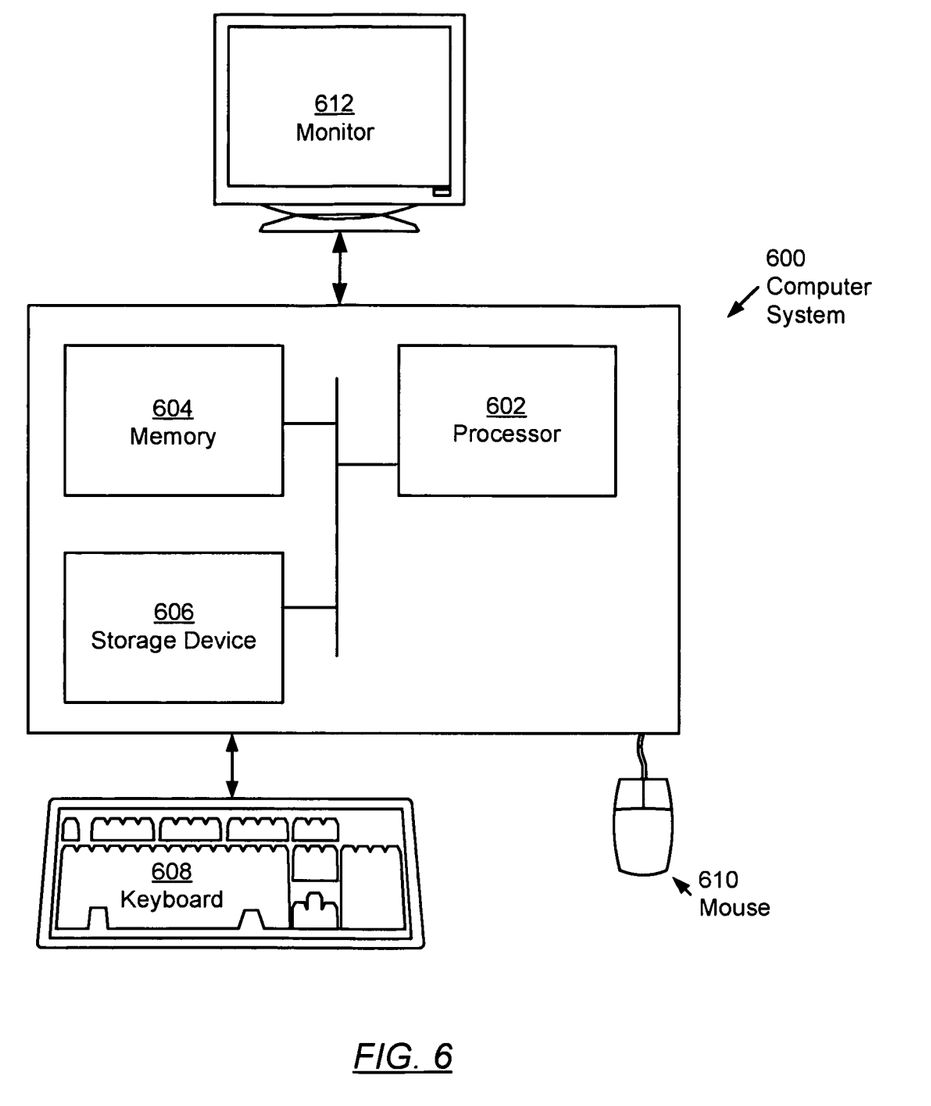
FIG. 6 shows a computer system in accordance with one or more embodiments of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a guest operating system (OS) executing on a host comprising:
receiving, by a host OS, from the guest OS associated with a first media access control (MAC) address, a second MAC address,
wherein the first MAC address is associated with a first guest virtual network interface card (VNIC) residing on the guest OS,
wherein the second MAC address is associated with a second guest VNIC residing on the guest OS,
wherein the second MAC address is sent from the guest OS in response to a creation of the second guest VNIC, and
wherein the guest OS and the host OS are executing on the host;
determining, by the host OS after receiving the second MAC address, an intermediate VNIC, to forward packets associated with the second MAC address to the guest OS, wherein packets associated with the first MAC address and received by the intermediate VNIC are forwarded to the guest OS; and
wherein the intermediate VNIC is executing on the host OS; and
forwarding, by the host OS, the second MAC address from the intermediate VNIC to a device driver associated with a physical network interface card (NIC) operatively connected to the host,
wherein the device driver configures a classifier on the physical NIC to forward packets associated with the second MAC address to a guest OS hardware receive ring (HRR) located on the physical NIC, wherein the guest OS HRR is associated with the intermediate VNIC; and
wherein packets associated with the first MAC address and received by the physical NIC are classified by the classifier and forwarded to the guest OS HRR.

2. The method of claim 1, wherein the guest OS is one of a plurality of guest OSs executing on the host.

3. The method of claim 1, wherein packets received by the physical NIC that are not associated with at least one selected from a group consisting of the first MAC and the second MAC address are forwarded to a host OS HRR.

4. The method of claim 3, wherein the host OS comprises:
a host VNIC configured to receive packets from the host OS HRR;
a host virtual network stack configured to receive packets from the host VNIC; and
a host packet destination.

5. The method of claim 1, wherein the second MAC address is sent by a pseudo NIC to the host OS, wherein the pseudo NIC is executing within the guest OS.

6. A system for managing a guest operating system (OS) comprising:
a physical network interface card (NIC) configured to receive a plurality of packets from a network, wherein packets associated with a first media access control (MAC) address are forwarded to a guest OS hardware receive ring (HRR) located on the physical NIC and associated with an intermediate virtual network interface card (VNIC);
a host, operatively connected to the physical NIC, comprising:
a processor;
a device driver associated with the physical NIC;
the guest OS comprising a first guest VNIC associated with the first MAC address, and configured to:
create a second guest VNIC associated with a second MAC address, and
after creating the second guest VNIC, send the second MAC address to a host OS; and
the host OS, executing on the processor, comprising the intermediate VNIC configured to forward packets associated with the first MAC address to the guest OS, wherein the host OS is configured to:
receive, from the guest OS, the second MAC address;
determine the intermediate VNIC to forward packets associated with the second MAC address to the guest OS; and
forward the second MAC address from the intermediate VNIC to the device driver,
wherein the device driver is configured to receive the second MAC address from the intermediate VNIC and configure the physical NIC to forward packets associated with the second MAC address to the guest OS HRR; and
wherein packets associated with the first MAC address and received by the physical NIC are classified by the classifier and forwarded to the quest OS HRR.

7. The system of claim 6, wherein the classifier is configured to forward packets that are not associated with at least one selected from a group consisting of the first MAC address and the second MAC address to a host OS HRR.

8. The system of claim 7, wherein the host OS further comprises:
a host VNIC configured to receive packets from the host OS HRR;
a host virtual network stack configured to receive packets from the host VNIC; and
a host packet destination.

9. The system of claim 6, wherein the guest OS further comprises a pseudo NIC configured to send a MAC address to the host OS.

10. The system of claim 6, wherein the guest OS is one of a plurality of guest OSs executing on the host.

11. A non-transitory computer readable medium comprising software instructions for managing a guest operating system (OS), wherein the software instructions comprise functionality to:
receive, by a host OS from the guest OS associated with a first media access control (MAC) address, a second MAC address,
wherein the first MAC address is associated with a first guest virtual network interface card (VNIC) residing on the guest OS,
wherein the second MAC address is associated with a second guest VNIC residing on the guest OS,
wherein the second MAC address is sent from the guest OS in response to a creation of the second guest VNIC, and
wherein the guest OS and the host OS are executing on the host;
determine, by the host OS after receiving the second MAC address, an intermediate VNIC to forward packets associated with the second MAC address to the guest OS,
wherein packets associated with the first MAC address and received by the intermediate VNIC are forwarded to the guest OS, and
wherein the intermediate VNIC is executing on the host OS; and
forward, by the host OS, the second MAC address from the intermediate VNIC to a device driver associated with a physical network interface card (NIC) operatively connected to the host, wherein the device driver configures a classifier on the physical NIC to forward packets associated with the second MAC address to a guest OS hardware receive ring (HRR) located on the physical NIC, wherein the guest OS HRR is associated with the intermediate VNIC; and wherein packets associated with the first MAC address and received by the physical NIC are classified by the classifier and forwarded to the guest OS HRR.

12. The non-transitory computer readable medium of claim 11, wherein the guest OS is one of a plurality of guest OSs executing on the host.

13. The non-transitory computer readable medium of claim 11, wherein packets received by the physical NIC that are not associated with at least one selected from a group consisting of the first MAC and the second MAC address are forwarded to a host OS HRR.

14. The non-transitory computer readable medium of claim 11, wherein the second MAC address is sent by a pseudo NIC to the host OS, wherein the pseudo NIC is executing within the guest OS.

* * * * *